US010755334B2

(12) United States Patent
Eades et al.

(10) Patent No.: US 10,755,334 B2
(45) Date of Patent: Aug. 25, 2020

(54) SYSTEMS AND METHODS FOR CONTINUALLY SCORING AND SEGMENTING OPEN OPPORTUNITIES USING CLIENT DATA AND PRODUCT PREDICTORS

(71) Applicant: vArmour Networks, Inc., Los Altos, CA (US)

(72) Inventors: Timothy Eades, Redwood City, CA (US); Eva Tsai, Cupertino, CA (US); Randy Magliozzi, Mountain View, CA (US); Namson Tran, San Francisco, CA (US)

(73) Assignee: vArmour Networks, Inc., Los Altos, CA (US)

( * ) Notice: Subject to any disclaimer, the term of this patent is extended or adjusted under 35 U.S.C. 154(b) by 0 days.

(21) Appl. No.: 15/199,605

(22) Filed: Jun. 30, 2016

(65) Prior Publication Data
US 2018/0005296 A1 Jan. 4, 2018

(51) Int. Cl.
G06Q 30/06 (2012.01)
G06N 20/00 (2019.01)

(52) U.S. Cl.
CPC ......... G06Q 30/0631 (2013.01); G06N 20/00 (2019.01)

(58) Field of Classification Search
None
See application file for complete search history.

(56) References Cited

U.S. PATENT DOCUMENTS

| 6,253,321 | B1 | 6/2001 | Nikander et al. |
| 6,484,261 | B1 | 11/2002 | Wiegel |
| 6,578,076 | B1 | 6/2003 | Putzolu |
| 6,765,864 | B1 | 7/2004 | Natarajan et al. |
| 6,970,459 | B1 | 11/2005 | Meier |

(Continued)

FOREIGN PATENT DOCUMENTS

| TW | 201642616 A | 12/2016 |
| TW | 201642617 A | 12/2016 |

(Continued)

OTHER PUBLICATIONS

Non-Final Office Action, dated Jul. 1, 2015, U.S. Appl. No. 14/673,640, filed Mar. 30, 2015.

(Continued)

Primary Examiner — Daniel T Pellett
(74) Attorney, Agent, or Firm — Carr & Ferrell LLP

(57) ABSTRACT

Systems and methods for machine learning and adaptive optimization are provided herein. A method includes continually receiving input that is indicative of client events, including client behaviors and respective outcomes of software trials of a product maintained in a database, continually segmenting open opportunities using the client behaviors and respective outcomes, continually scoring and prioritizing the open opportunities using the client behaviors and respective outcomes for targeting and re-targeting, continually adjusting targeted proposals to open opportunities and sourcing in prospects based on a targeting scheme, continually presenting targeted offers to create expansion opportunities and updating a product roadmap of the product using the open opportunities, the product roadmap including technical specifications for the product.

22 Claims, 5 Drawing Sheets

(56) References Cited

U.S. PATENT DOCUMENTS

| | | | |
|---|---|---|---|
| 6,981,155 B1 | 12/2005 | Lyle et al. | |
| 7,058,712 B1 | 6/2006 | Vasko et al. | |
| 7,062,566 B2 | 6/2006 | Amara et al. | |
| 7,096,260 B1 | 8/2006 | Zavalkovsky et al. | |
| 7,373,524 B2 * | 5/2008 | Motsinger | H04L 63/0876 713/188 |
| 7,397,794 B1 | 7/2008 | Lacroute et al. | |
| 7,467,408 B1 | 12/2008 | O'Toole, Jr. | |
| 7,475,424 B2 | 1/2009 | Lingafelt et al. | |
| 7,516,476 B1 | 4/2009 | Kraemer et al. | |
| 7,519,062 B1 | 4/2009 | Kloth et al. | |
| 7,694,181 B2 * | 4/2010 | Noller | G06F 11/3688 714/38.11 |
| 7,725,937 B1 | 5/2010 | Levy | |
| 7,742,414 B1 | 6/2010 | Iannaccone et al. | |
| 7,774,837 B2 | 8/2010 | McAlister | |
| 7,849,495 B1 | 12/2010 | Huang et al. | |
| 7,900,240 B2 | 3/2011 | Terzis et al. | |
| 7,904,454 B2 | 3/2011 | Raab | |
| 7,996,255 B1 * | 8/2011 | Shenoy | G06Q 30/02 705/7.29 |
| 8,051,460 B2 | 11/2011 | Lum et al. | |
| 8,112,304 B2 | 2/2012 | Scates | |
| 8,254,381 B2 | 8/2012 | Allen et al. | |
| 8,259,571 B1 | 9/2012 | Raphel et al. | |
| 8,291,495 B1 | 10/2012 | Burns et al. | |
| 8,296,459 B1 | 10/2012 | Brandwine et al. | |
| 8,307,422 B2 | 11/2012 | Varadhan et al. | |
| 8,321,862 B2 | 11/2012 | Swamy et al. | |
| 8,353,021 B1 | 1/2013 | Satish et al. | |
| 8,369,333 B2 | 2/2013 | Hao et al. | |
| 8,396,986 B2 | 3/2013 | Kanada et al. | |
| 8,429,647 B2 | 4/2013 | Zhou | |
| 8,468,113 B2 | 6/2013 | Harrison et al. | |
| 8,490,153 B2 | 7/2013 | Bassett et al. | |
| 8,494,000 B1 | 7/2013 | Nadkarni et al. | |
| 8,499,330 B1 | 7/2013 | Albisu et al. | |
| 8,528,091 B2 | 9/2013 | Bowen et al. | |
| 8,539,548 B1 | 9/2013 | Overby, Jr. et al. | |
| 8,565,118 B2 | 10/2013 | Shukla et al. | |
| 8,612,744 B2 | 12/2013 | Shieh | |
| 8,661,434 B1 | 2/2014 | Liang et al. | |
| 8,677,496 B2 | 3/2014 | Wool | |
| 8,688,491 B1 * | 4/2014 | Shenoy | G06Q 30/02 705/7.11 |
| 8,726,343 B1 | 5/2014 | Borzycki et al. | |
| 8,730,963 B1 | 5/2014 | Grosser, Jr. et al. | |
| 8,798,055 B1 | 8/2014 | An | |
| 8,813,169 B2 | 8/2014 | Shieh et al. | |
| 8,813,236 B1 | 8/2014 | Saha et al. | |
| 8,819,762 B2 | 8/2014 | Harrison et al. | |
| 8,898,788 B1 | 11/2014 | Aziz et al. | |
| 8,935,457 B2 | 1/2015 | Feng et al. | |
| 8,938,782 B2 | 1/2015 | Sawhney et al. | |
| 8,990,371 B2 | 3/2015 | Kalyanaraman et al. | |
| 9,009,829 B2 | 4/2015 | Stolfo et al. | |
| 9,015,299 B1 | 4/2015 | Shah | |
| 9,027,077 B1 | 5/2015 | Bharali et al. | |
| 9,036,639 B2 | 5/2015 | Zhang | |
| 9,060,025 B2 | 6/2015 | Xu | |
| 9,141,625 B1 | 9/2015 | Thornewell et al. | |
| 9,191,327 B2 | 11/2015 | Shieh | |
| 9,258,275 B2 | 2/2016 | Sun et al. | |
| 9,294,302 B2 | 3/2016 | Sun et al. | |
| 9,294,442 B1 | 3/2016 | Lian et al. | |
| 9,361,089 B2 | 6/2016 | Bradfield et al. | |
| 9,380,027 B1 | 6/2016 | Lian et al. | |
| 9,405,665 B1 * | 8/2016 | Shashi | G06F 16/2246 |
| 9,407,602 B2 | 8/2016 | Feghali et al. | |
| 9,521,115 B1 | 12/2016 | Woolward | |
| 9,609,083 B2 | 3/2017 | Shieh | |
| 9,621,595 B2 | 4/2017 | Lian et al. | |
| 9,680,852 B1 | 6/2017 | Wager et al. | |
| 9,762,599 B2 | 9/2017 | Wager et al. | |
| 9,973,472 B2 | 5/2018 | Woolward et al. | |
| 10,009,317 B2 | 6/2018 | Woolward | |
| 10,009,381 B2 | 6/2018 | Lian et al. | |
| 10,091,238 B2 | 10/2018 | Shieh et al. | |
| 10,191,758 B2 | 1/2019 | Ross et al. | |
| 10,193,929 B2 | 1/2019 | Shieh et al. | |
| 10,264,025 B2 | 4/2019 | Woolward | |
| 10,333,827 B2 | 6/2019 | Xu et al. | |
| 10,333,986 B2 | 6/2019 | Lian et al. | |
| 10,382,467 B2 | 8/2019 | Wager et al. | |
| 2002/0031103 A1 | 3/2002 | Wiedeman et al. | |
| 2002/0066034 A1 | 5/2002 | Schlossberg et al. | |
| 2003/0055950 A1 | 3/2003 | Cranor et al. | |
| 2003/0177389 A1 | 9/2003 | Albert et al. | |
| 2004/0062204 A1 | 4/2004 | Bearden et al. | |
| 2004/0095897 A1 | 5/2004 | Vafaei | |
| 2004/0172557 A1 | 9/2004 | Nakae et al. | |
| 2005/0021943 A1 | 1/2005 | Ikudome et al. | |
| 2005/0033989 A1 | 2/2005 | Poletto et al. | |
| 2005/0114829 A1 * | 5/2005 | Robin | G06Q 10/06 717/101 |
| 2005/0190758 A1 | 9/2005 | Gai et al. | |
| 2005/0201343 A1 | 9/2005 | Sivalingham et al. | |
| 2005/0246241 A1 * | 11/2005 | Irizarry, Jr. | G06Q 30/0601 705/26.1 |
| 2005/0283823 A1 | 12/2005 | Okajo et al. | |
| 2006/0005228 A1 | 1/2006 | Matsuda | |
| 2006/0037077 A1 | 2/2006 | Gadde et al. | |
| 2006/0050696 A1 | 3/2006 | Shah et al. | |
| 2007/0016945 A1 | 1/2007 | Bassett et al. | |
| 2007/0019621 A1 | 1/2007 | Perry et al. | |
| 2007/0022090 A1 | 1/2007 | Graham | |
| 2007/0064617 A1 | 3/2007 | Reves | |
| 2007/0079308 A1 | 4/2007 | Chiaramonte et al. | |
| 2007/0130566 A1 | 6/2007 | van Rietschote et al. | |
| 2007/0157286 A1 | 7/2007 | Singh et al. | |
| 2007/0168971 A1 * | 7/2007 | Royzen | G06F 11/3688 717/124 |
| 2007/0192861 A1 | 8/2007 | Varghese et al. | |
| 2007/0192863 A1 | 8/2007 | Kapoor et al. | |
| 2007/0198656 A1 | 8/2007 | Mazzaferri et al. | |
| 2007/0239987 A1 | 10/2007 | Hoole et al. | |
| 2007/0271612 A1 | 11/2007 | Fang et al. | |
| 2007/0277222 A1 | 11/2007 | Pouliot | |
| 2008/0016339 A1 | 1/2008 | Shukla | |
| 2008/0016550 A1 | 1/2008 | McAlister | |
| 2008/0083011 A1 | 4/2008 | McAlister et al. | |
| 2008/0155239 A1 | 6/2008 | Chowdhury et al. | |
| 2008/0163207 A1 | 7/2008 | Reumann et al. | |
| 2008/0229382 A1 | 9/2008 | Vitalos | |
| 2008/0239961 A1 | 10/2008 | Hilerio et al. | |
| 2008/0301770 A1 | 12/2008 | Kinder | |
| 2008/0307110 A1 | 12/2008 | Wainner et al. | |
| 2009/0077621 A1 | 3/2009 | Lang et al. | |
| 2009/0083445 A1 | 3/2009 | Ganga | |
| 2009/0138316 A1 * | 5/2009 | Weller | G06Q 10/10 705/7.11 |
| 2009/0165078 A1 | 6/2009 | Samudrala et al. | |
| 2009/0190585 A1 | 7/2009 | Allen et al. | |
| 2009/0249470 A1 | 10/2009 | Litvin et al. | |
| 2009/0260051 A1 | 10/2009 | Igakura | |
| 2009/0268667 A1 | 10/2009 | Gandham et al. | |
| 2009/0328187 A1 | 12/2009 | Meisel | |
| 2010/0043068 A1 | 2/2010 | Varadhan et al. | |
| 2010/0064341 A1 | 3/2010 | Aldera | |
| 2010/0071025 A1 | 3/2010 | Devine et al. | |
| 2010/0088738 A1 | 4/2010 | Birnbach | |
| 2010/0095367 A1 | 4/2010 | Narayanaswamy | |
| 2010/0191863 A1 | 7/2010 | Wing | |
| 2010/0192223 A1 | 7/2010 | Ismael et al. | |
| 2010/0192225 A1 | 7/2010 | Ma et al. | |
| 2010/0199349 A1 | 8/2010 | Ellis | |
| 2010/0208699 A1 | 8/2010 | Lee et al. | |
| 2010/0228962 A1 | 9/2010 | Simon et al. | |
| 2010/0235880 A1 | 9/2010 | Chen et al. | |
| 2010/0274970 A1 | 10/2010 | Treuhaft et al. | |
| 2010/0281539 A1 | 11/2010 | Burns et al. | |
| 2010/0287544 A1 | 11/2010 | Bradfield et al. | |
| 2010/0333165 A1 | 12/2010 | Basak et al. | |
| 2011/0003580 A1 | 1/2011 | Belrose et al. | |

(56) References Cited

U.S. PATENT DOCUMENTS

| | | |
|---|---|---|
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1 | 3/2013 | McDougal et al. |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0344435 A1* | 11/2014 | Mortimore, Jr. .... H04L 41/5051 709/223 |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0229641 A1 | 8/2015 | Sun et al. |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 | 8/2016 | Ashley et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2017/0005986 A1 | 1/2017 | Bansal et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0279770 A1 | 9/2017 | Woolward et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0191779 A1 | 7/2018 | Shieh et al. |
| 2019/0342307 A1 | 11/2019 | Gamble et al. |
| 2019/0394225 A1 | 12/2019 | Vajipayajula et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | W02017100365 A1 | 6/2017 |

OTHER PUBLICATIONS

Final Office Action, dated Dec. 4, 2015, U.S. Appl. No. 14/673,640, filed Mar. 30, 2015.

Notice of Allowance, dated Feb. 16, 2016, U.S. Appl. No. 14/673,640, filed Mar. 30, 2015.

Non-Final Office Action, dated Jul. 7, 2015, U.S. Appl. No. 14/673,679, filed Mar. 30, 2015.

Non-Final Office Action, dated Jul. 16, 2015, U.S. Appl. No. 14/677,827, filed Apr. 2, 2015.

Final Office Action, dated Dec. 2, 2015, U.S. Appl. No. 14/677,827, filed Apr. 2, 2015.

Non-Final Office Action, dated Nov. 19, 2014, U.S. Appl. No. 13/363,082, filed Jan. 31, 2012.

Final Office Action, dated Apr. 30, 2015, U.S. Appl. No. 13/363,082, filed Jan. 31, 2012.

Notice of Allowance, dated Aug. 12, 2015, U.S. Appl. No. 13/363,082, filed Jan. 31, 2012.

Non-Final Office Action, dated Jan. 23, 2015, U.S. Appl. No. 13/847,881, filed Mar. 20, 2013.

Final Office Action, dated May 13, 2015, U.S. Appl. No. 13/847,881, filed Mar. 20, 2013.

Notice of Allowance, dated Nov. 9, 2015, U.S. Appl. No. 13/847,881, filed Mar. 20, 2013.

Non-Final Office Action, dated May 1, 2015, U.S. Appl. No. 13/860,404, filed Apr. 10, 2014.

Final Office Action, dated Dec. 3, 2015, U.S. Appl. No. 13/860,404, filed Apr. 10, 2014.

Non-Final Office Action, dated Aug. 12, 2014, U.S. Appl. No. 13/861,220, filed Apr. 11, 2013.

Final Office Action, dated Jan. 23, 2015, U.S. Appl. No. 13/861,220, filed Apr. 11, 2013.

Non-Final Office Action, dated May 18, 2015, U.S. Appl. No. 13/861,220, filed Apr. 11, 2013.

Non-Final Office Action, dated Jan. 28, 2016, U.S. Appl. No. 14/877,836, filed Oct. 7, 2015.

Non-Final Office Action, dated May 18, 2016, U.S. Appl. No. 14/964,318, filed Dec. 9, 2015.

Non-Final Office Action, dated Jul. 6, 2016, U.S. Appl. No. 15/151,303, filed May 10, 2016.

(56) References Cited

OTHER PUBLICATIONS

Final Office Action, dated Jul. 7, 2016, U.S. Appl. No. 14/877,836, filed Oct. 7, 2015.
Woolward et al., "Methods and Systems for Orchestrating Physical and Virtual Switches to Enforce Security Boundaries," U.S. Appl. No. 14/677,827, filed Apr. 2, 2015.
Shieh et al., "Methods and Systems for Providing Security to Distributed Microservices," U.S. Appl. No. 14/657,282, filed Mar. 13, 2015.
Shieh et al., "Methods and Systems for Improving Analytics in Distributed Networks," U.S. Appl. No. 14/657,210, filed Mar. 13, 2015.
International Search Report dated May 3, 2016 in Patent Cooperation Treaty Application No. PCT/US2016/024116 filed Mar. 24, 2016.
International Search Report dated May 3, 2016 in Patent Cooperation Treaty Application No. PCT/US2016/024300 filed Mar. 25, 2016.
International Search Report dated May 3, 2016 in Patent Cooperation Treaty Application No. PCT/US2016/024053 filed Mar. 24, 2016.
International Search Report dated May 6, 2016 in Patent Cooperation Treaty Application No. PCT/US2016/019643 filed Feb. 25, 2016.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.
International Search Report dated Jun. 20, 2016 in Patent Cooperation Treaty Application No. PCT/US2016/024310 filed Mar. 25, 2016.
Non-Final Office Action, dated Jan. 5, 2017, U.S. Appl. No. 15/348,978, filed Nov. 10, 2016.
Notice of Allowance, dated Feb. 1, 2017, U.S. Appl. No. 15/090,523, filed Apr. 4, 2016.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, Jan. 12, 2017, 20 pages.
Notice of Allowance, dated Nov. 17, 2016, U.S. Appl. No. 14/877,836, filed Oct. 7, 2015.
Notice of Allowance, dated Nov. 29, 2016, U.S. Appl. No. 15/151,303, filed May 10, 2016.
Final Office Action, dated Nov. 14, 2016, U.S. Appl. No. 14/964,318, filed Dec. 9, 2015.
Final Office Action, dated Jan. 4, 2017, U.S. Appl. No. 14/657,210, filed Mar. 13, 2015.
Non-Final Office Action, dated Jul. 25, 2016, U.S. Appl. No. 15/090,523, filed Apr. 4, 2016.
Notice of Allowance, dated Jul. 27, 2016, U.S. Appl. No. 15/080,519, filed Mar. 24, 2016.
Non-Final Office Action, dated Aug. 2, 2016, U.S. Appl. No. 14/657,210, filed Mar. 13, 2015.
Non-Final Office Action, dated Sep. 16, 2016, U.S. Appl. No. 15/209,275, filed Jul. 13, 2016.
Non-Final Office Action, dated Jul. 14, 2016, U.S. Appl. No. 13/860,404, filed Apr. 10, 2013.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.
Woolward et al., "Template-Driven Intent-Based Security," U.S. Appl. No. 16/428,838, May 31, 2019, Specification, Claims, Abstract, and Drawings, 60 pages.
Woolward et al., "Validation of Cloud Security Policies," U.S. Appl. No. 16/428,849, May 31, 2019, Specification, Claims, Abstract, and Drawings, 54 Pages.
Woolward et al., "Reliability Prediction for Cloud Security Policies," U.S. Appl. No. 16/428,858, May 31, 2019, Specification, Claims, Abstract, and Drawings, 59 pages.

* cited by examiner

SYSTEMS AND METHODS FOR CONTINUALLY SCORING AND SEGMENTING OPEN OPPORTUNITIES USING CLIENT DATA AND PRODUCT PREDICTORS

FIELD OF THE INVENTION

The present technology is directed to machine learning and adaptive optimization systems and methods that allow for scoring and segmenting of data in a network.

SUMMARY

According to some embodiments, the present disclosure is directed to a machine learning and adaptive optimization method, the method comprising: (a) continually receiving input that is indicative of client events comprising client data comprising third party sources and respective outcomes of software trials of a product maintained in a database; (b) continually segmenting open opportunities using the client behaviors and respective outcomes; (c) continually scoring the open opportunities using the client behaviors and respective outcomes; and (d) updating a product roadmap of the product using the open opportunities, the product roadmap comprising a technical specifications for the product.

According to some embodiments, the present disclosure is directed to a machine learning and adaptive optimization method, the method comprising: (a) continually receiving input that is indicative of client events comprising client behaviors and respective outcomes of software trials of a product maintained in a database; (b) continually segmenting open opportunities using the client behaviors and respective outcomes; (c) continually scoring the open opportunities using the client behaviors and respective outcomes; (d) determining client behaviors that are associated with closed opportunities; (e) tailoring a targeted proposal to clients associated with the open opportunities that have client behaviors that are associated with closed won opportunities; and (f) applying a feedback loop that utilizes client behaviors of the clients receiving the targeted proposal if the clients result in closed opportunities, the feedback loop placing the client behaviors into the database.

According to some embodiments, the present disclosure is directed to a machine learning and adaptive optimization system, the system comprising: (a) a processor; and (b) a memory for storing executable instructions, the processor executing the instructions to: (i) continually receive input that is indicative of client events comprising client behaviors and respective outcomes of software trials of a product maintained in a database; (ii) determine predictors that include client behaviors and respective outcomes of closed opportunities; (iii) continually segment open opportunities using the client behaviors and respective outcomes relative to the predictors; (iv) continually score the open opportunities using the client behaviors and respective outcomes relative to the predictors; and (v) update a product roadmap of the product using the open opportunities and the predictors, the product roadmap comprising technical specifications for the product. In further embodiments, the processor may execute instructions to selectively source in prospects based on segmentation and scoring.

According to some embodiments, the present disclosure is directed to a system comprising: (a) means for continually receiving input that is indicative of client events comprising client behaviors and respective outcomes of software trials of a product maintained in a database; (b) means for continually segmenting open opportunities using the client behaviors and respective outcomes; (c) means for continually scoring the open opportunities using the client behaviors and respective outcomes; and (d) means for updating a product roadmap of the product using the open opportunities, the product roadmap comprising a technical specifications for the product.

According to some embodiments, the present disclosure is directed to a machine learning and adaptive optimization method, the method comprising: (a) means for continually receiving input that is indicative of client events comprising client behaviors and respective outcomes of software trials of a product maintained in a database; (b) means for continually segmenting open opportunities using the client behaviors and respective outcomes; (c) means for continually scoring the open opportunities using the client behaviors and respective outcomes; (d) means for determining client behaviors that are associated with closed opportunities; (e) means for tailoring a targeted proposal to clients associated with the open opportunities that have client behaviors that are associated with closed opportunities; and (f) means for applying a feedback loop that utilizes client behaviors of the clients receiving the targeted proposal if the clients result in closed opportunities, the feedback loop placing the client behaviors into the database.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
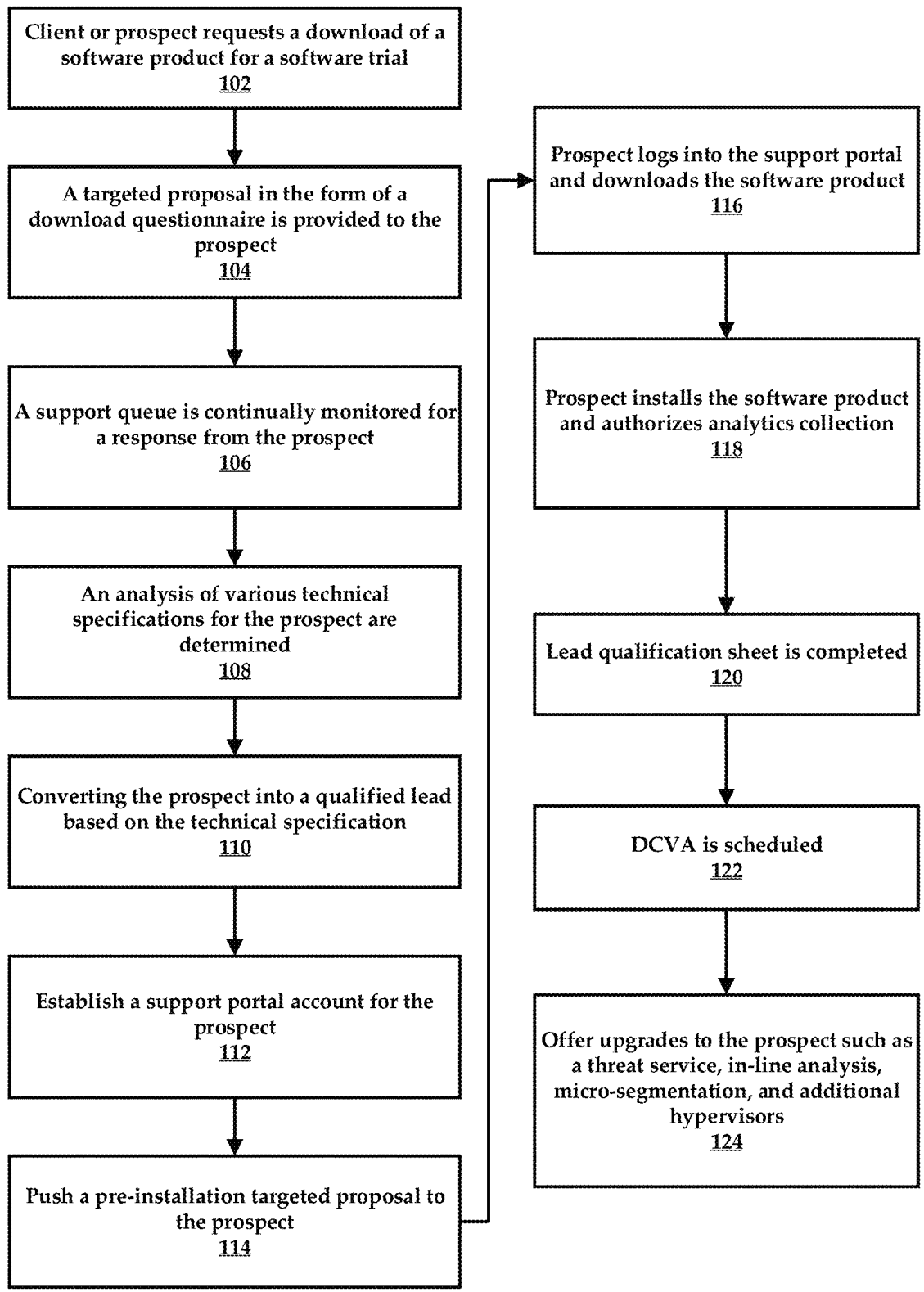
FIG. 1 is a flow diagram of method for machine learning and adaptive optimization techniques.

The present disclosure is directed to systems and methods for machine learning and adaptive optimization of processes. In some embodiments, the processes that are optimized include, but are not limited to, software testing and fulfillment, where observable metrics (such as targeting and outcomes) and client behaviors associated with successful closed opportunities are evaluated and analyzed to create a database of information. Current open opportunities are parsed to determine metrics and client behaviors that correspond to those of successful closed opportunities. Differences between the metrics of open opportunities and the metrics of successfully closed opportunities are determined and serve as the basis for selectively adjusting a targeting scheme for the open opportunities that changes how the clients are being targeted with electronic messaging.

The opportunities relate to software trials of a software product by a plurality of clients. Client experiences during these software trials are utilized as the basis for creating the database.

In some embodiments, the metrics and client data, both implicit and explicit, (which can include behaviors and other empirical data) are utilized to update a software product roadmap that is utilized to change technical specifications of the software product.

The systems and methods achieve these actions using continuous feedback loops, where feedback from the targeted content is evaluated to parse out metrics, client behaviors, and outcomes. In one or more embodiments, the systems and methods determine metrics such as opportunity scores and client segmentation. The opportunity scoring is a mathematical representation of how open opportunities compare with various predictors. In one embodiment, the scoring is indicative of how likely an opportunity will result in a successful outcome. Predictors can include database attributes that correlate either positively or negatively to successful outcomes. Again, the predictors are deduced or determined from the successful closed opportunities.

An example of predictor values includes, but is not limited to, available budget, if a client initiative is determinable, purchase timeframe, satisfaction level with similar or related software products, threat levels (how likely the client is to need a solution for protection), client interest in regulatory compliance, security automation, and micro-segmentation, a visibility of the client, and other variables or combinations thereof. Each predictor value can be weighted in some embodiments to affect the scoring of an opportunity. For example, the available budget and purchase time frame predictors can be weighted more heavily in some embodiments.

An example algorithm for calculating an opportunity score includes, but is not limited to a lead qualification sheet value added to various values calculated for a technical survey of the client, a sales engineering assessment, sales behaviors, product usage, feedback, marketing engagement, and third party data. Each component is calculated as a sum of [Coeffient-1*Input-1+Coefficient-2*Input-2 . . . Coefficient-n*Input-n], where each coefficient is determined through recurring regression analysis using a weighted probability of positive outcome (i.e., Closed Won/Successful Opportunity) across all inputs. Again, this is merely an example algorithm that can be utilized to implement aspects of the present disclosure. As mentioned above, the systems and methods can utilize both explicit and implicit client behaviors. Examples of explicit behaviors can be linked to various phases of software trials. As mentioned above, the opportunities relate to software trials of a software product by a plurality of clients. Client experiences during these software trials are utilized as the basis for creating a database.

The software trial can be evaluated in various phases such as pre-installation, installation, visibility, and use of micro-segmentation. These phases provide explicit behavior that is representative of the client experience through the software trial. Behaviors that are strong positive indicators of a current open opportunity being a successful closed opportunity include high visibility and high use of applications, services, and high network traffic. Strong positive correlations include anomalous application and workload behavior, and application awareness, client use of micro-segmentation, existence of internal compliance procedures, and existence of security automation and dynamic policies for the client's network. Client use of open source cloud products were present in open opportunities that resulted in a low or no likelihood of purchase of the software product. On the other hand, use of public-private cloud security is a positive predictor.

Implicit behaviors include pre-sales and post-sales account engagement, marketing engagement, prospect usage of the product, sales activities, partner deal registrations, and combinations thereof. In sum, explicit data is an expressed preference of a prospect, while implicit data is observed actions or metrics.

The implicit and explicit data can be gathered during an open opportunity using surveys, email communications, and other forms of communication such as feedback questionnaires, referred to as targeted proposals. Surveys can be utilized to determine product usage, technical challenges, use cases, target environment, email communications, and so forth. The targeted proposals are generated according to a targeting scheme that is tuned by the feedback received from targeted clients. That is, the systems utilize a targeting scheme that defines content and touchpoints of the targeted proposals, leveraging positive predictors in orchestrated sequences to provide value and increase engagement and likelihood of winning that opportunity. A targeting scheme could include, for example, a schema for building targeted emails re-framing the problems, driving the solution, using the product and influencing buying decisions that are relevant to helping the client convert into a purchaser during or after the software trial phases.

The systems and methods of the present disclosure continually receive feedback from these various types of communication, parse the input, and utilize analytics or metrics to selectively adjust either or both of (1) a targeting of future communication to the prospects; and (2) technical specifications of the software product so as to suit the preferences of the targeted clients.

FIG. 1 is an example flow diagram of a machine learning and optimization process. The process begins when a client or prospect requests a download of a software product for a software trial at step 102. A targeted proposal in the form of a download questionnaire is provided to the prospect in step 104.

The system provides a support queue which is continually monitored for a response from the prospect in step 106. In step 108 an analysis of various technical specifications for the prospect are determined. Again, this can be accomplished using targeted questionnaires or surveys that are transmitted to the client over a network. This step can be utilized to elicit various explicit behaviors/information from the prospect. The system can compare these explicit behaviors/information to predictors in a database to classify a prospect as having high likelihood of purchasing the product based on current set of both positive and negative predictors. If the prospect fits various technical criteria the system then converts the prospect into a qualified lead in step 110. In step 112 the system will establish a support portal account for the prospect and push a pre-installation targeted proposal to the prospect in step 114. The prospect can log into the support portal and download the software product in step 116. The prospect can also be required to sign or otherwise agree to a download agreement. Thus, the systems of the present disclosure make the software product available for trial by placing the software product for download on a server or cloud resource. The prospect accesses the software product through the support portal that was established for the prospect. In step 118, the prospect installs the software product and authorizes analytics collection. In one embodiment, a client authorizes data collection during installation and as the prospect uses the product, usage data maybe captured and centrally collected into a database for analysis. In some embodiments, a lead qualification sheet qualifying explicit BANT (Budget, Authority, Need, Timeline) information is completed at step 120 and a post-installation assessment is scheduled in step 122. In step 124, the system will offer to the prospect upgrades to the product.

Figure 2:
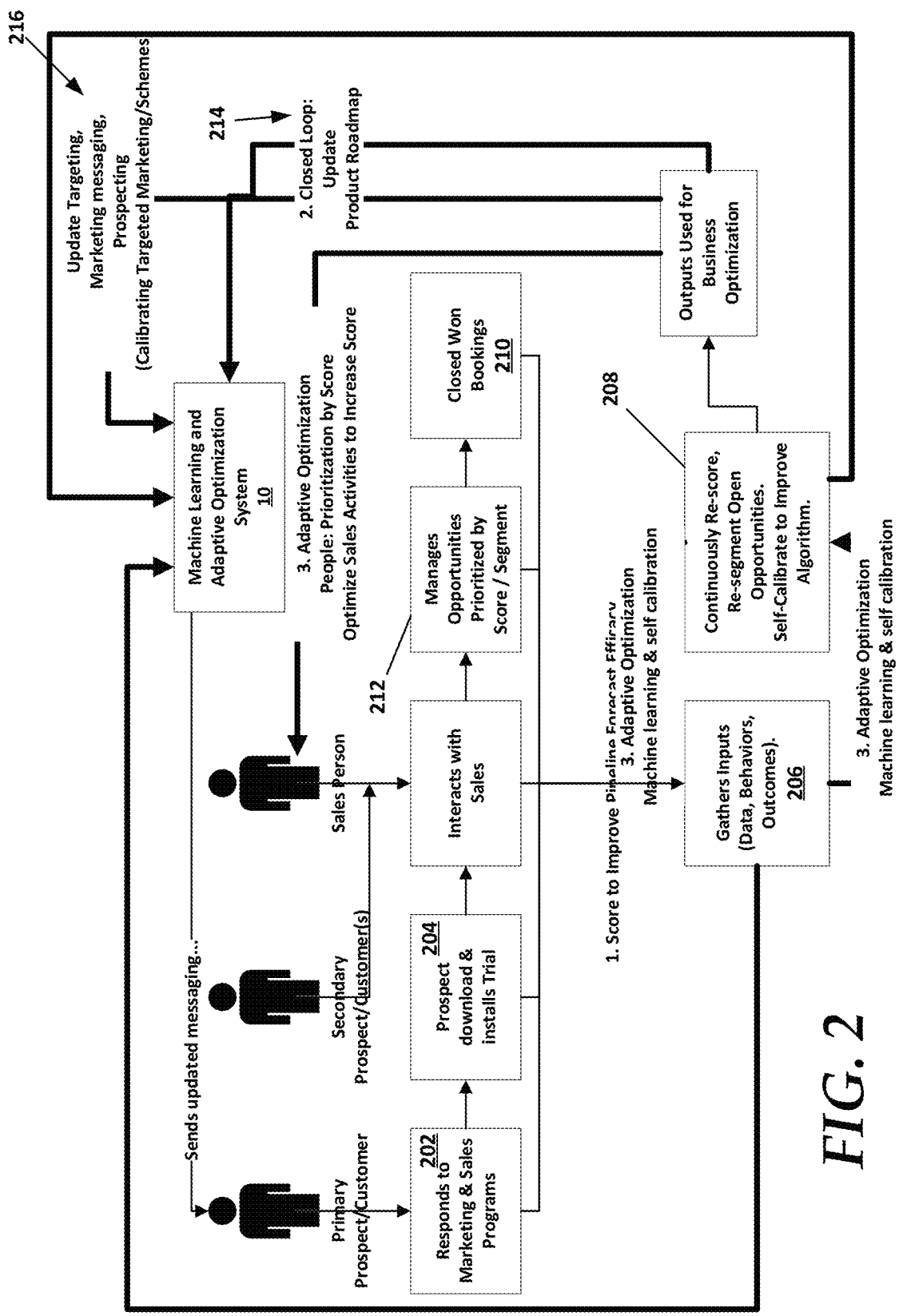
FIG. 2 is a flow diagram of another method for machine learning and adaptive optimization techniques.

FIG. 2 is a flow diagram of another example method where a customer responds to a targeted proposal in step 202. The targeted proposal can include digital marketing and sales programs that are designed to entice prospects to download a software program.

The machine learning and adaptive optimization system 10 (also referred to a system 10) provides the targeted proposal to a prospect in some embodiments. Again, the targeted proposal can be selectively adjusted in content using a targeting scheme. Thus, the system 10 can apply a target scheme for clients that are intended to download and try a software product. The targeted proposal can be adjusted from explicit and implicit information gathered from the prospect.

Next, the prospect downloads and installs the software product in step 204. This begins the software trial phases described above. During this process the prospect interacts with sales team members. Inputs, such as explicit data, client behaviors for implicit data, and outcomes are gathered and fed into the system 10. In some embodiments, the system 10 continually receives input that is indicative of client events comprising client behaviors and respective outcomes of software trials of a product maintained in a database in step 206.

As the system 10 gathers input, the system 10 then continually segments (re-segmenting) the open opportunities using the client behaviors and respective outcomes in step 208. That is, the system 10 determines attributes or parameters that are similar amongst current and former prospects, both successfully closed (prospect purchased software) and unsuccessfully closed prospects (prospect did not purchase software). Data from successful prospects are provided in step 210. Management of opportunities, such as prioritization based on opportunity scores and segments occurs in step 212.

In one embodiment, the segmentation of explicit and implicit data, as well as outcomes, can be used to determine how close or disparate a current open prospect is to converting to a sale. Step 208 also includes continually scoring (e.g., re-scoring) the open opportunities using the client behaviors and respective outcomes. As mentioned above, the scoring can include calculating scores relative to predictors that were determined for successful prospects. As mentioned above, predictor values include, but are not limited to, available budget, if a client initiative is determinable, purchase timeframe, satisfaction level with similar or related software products, threat levels (how likely the client is to need a solution for protection), client interest in regulatory compliance, security automation, and micro-segmentation, a visibility of the client, product usage, and other variables or combinations thereof. Each predictor value can be weighted in some embodiments to affect the scoring of an opportunity.

For example, the available budget and purchase time frame predictors can be weighted more heavily in some embodiments.

The results of segmentation and scoring are leveraged in the optimization processes. An example optimization process includes an updating of a product roadmap for the downloaded software product. The product roadmap can include technical specifications that can be automatically adjusted based on current open opportunities (e.g., prospects) in step 214. For example, the prospect indicates that the software product is lacking in a particular feature. The feature is added to a feedback loop that results in the selective adjustment of a product roadmap to include the requested feature.

Stated otherwise, an adjustment of a product roadmap of the product using the open opportunities occurs.

In another example optimization process such as in step 216, the method includes calibrating a targeting scheme and sourcing in prospects based on the segmenting and scoring, as well as selectively adjusting a targeted proposal for each of the open opportunities based on the targeting scheme. An example of this process includes selectively adjusting the content of an email marketing campaign to include content that is more specifically aligned with the needs of the prospects, or is more likely to entice the prospects into purchasing based on needs observed through segmentation of the prospect's explicit and/or implicit data. In addition, the method selectively presents targeted proposal to existing customers for expansion opportunities, based on the targeting scheme. Expansion opportunities are opportunities to create product and services usage and footprint in an existing customer.

In addition, an example optimization can include selective ranking of prospects using the calculated opportunity scores. Sales agents can target prospects that are likely to close. Also, the system 10 can adjust a sales and marketing campaign for the sales agents when prospects are failing to convert or have relatively lower opportunity scores. The system 10 can implement an opportunity score threshold that serves as a cutoff point. When prospects have an opportunity score that falls below the opportunity score threshold, the prospect is removed from consideration. Prospects having opportunity scores above the opportunity score threshold are re-evaluated, and marketing or targeted proposals are adjusted in correspondence with the weak opportunity score components identified by the system 10. For example, if the system determines that a prospect has a low composite score for business drivers, the system 10 can tailor the electronic targeted proposals to engage with the prospect around business drivers. If the system determines that a sales agent does not have enough prospects above the opportunity score threshold, it alerts and calibrates more suitable prospects and engages them with targeted proposals to increase score and likelihood of winning.

Figure 3:
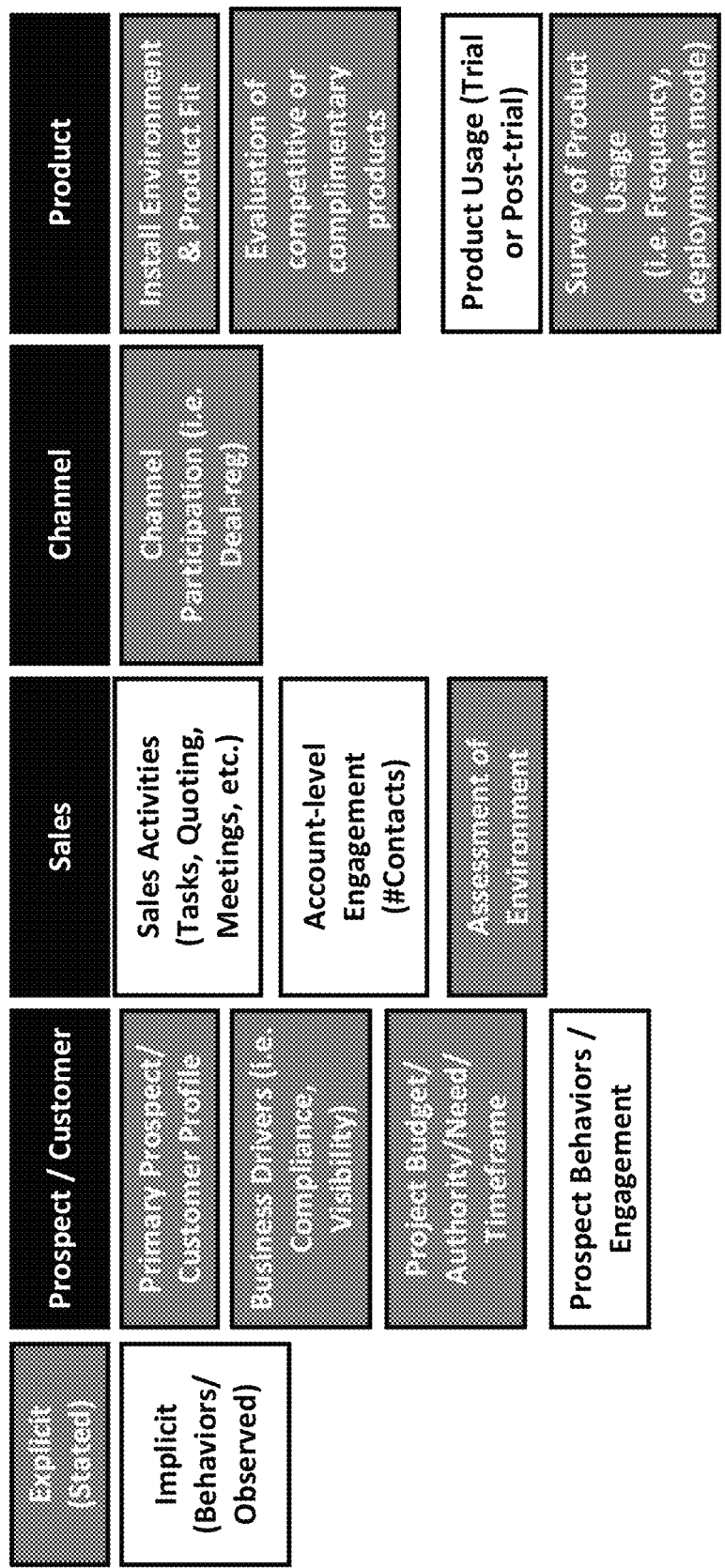
FIG. 3 is a matrix of example predictors that are utilized in the machine learning and adaptive optimization techniques of FIGS. 1 and 2.

FIG. 3 illustrates a matrix of example predictors that are indicative of a prospect that is likely to convert into a purchasing customer. In some embodiments, the predictors are indicative of not only the prospects, but also a sales team, a channel (where the product is sold), and the product itself. For example, input gathered from a prospect or customer can be evaluated for explicit data from a customer profile, various business drivers for the prospect, and budget, authority, need, and purchase timeframe. Implicit data can include various behaviors such as engagement or use of the software, and engagement of the prospect with the system or a sales team.

Sales team input can include explicit data such as sales activities, and account level engagement, while implicit data includes assessment of a sales environment. Channels and products can also have various explicit and implicit data that is gathered and used to evaluate a prospect's likelihood of conversion into a purchasing customer.

Figure 4:
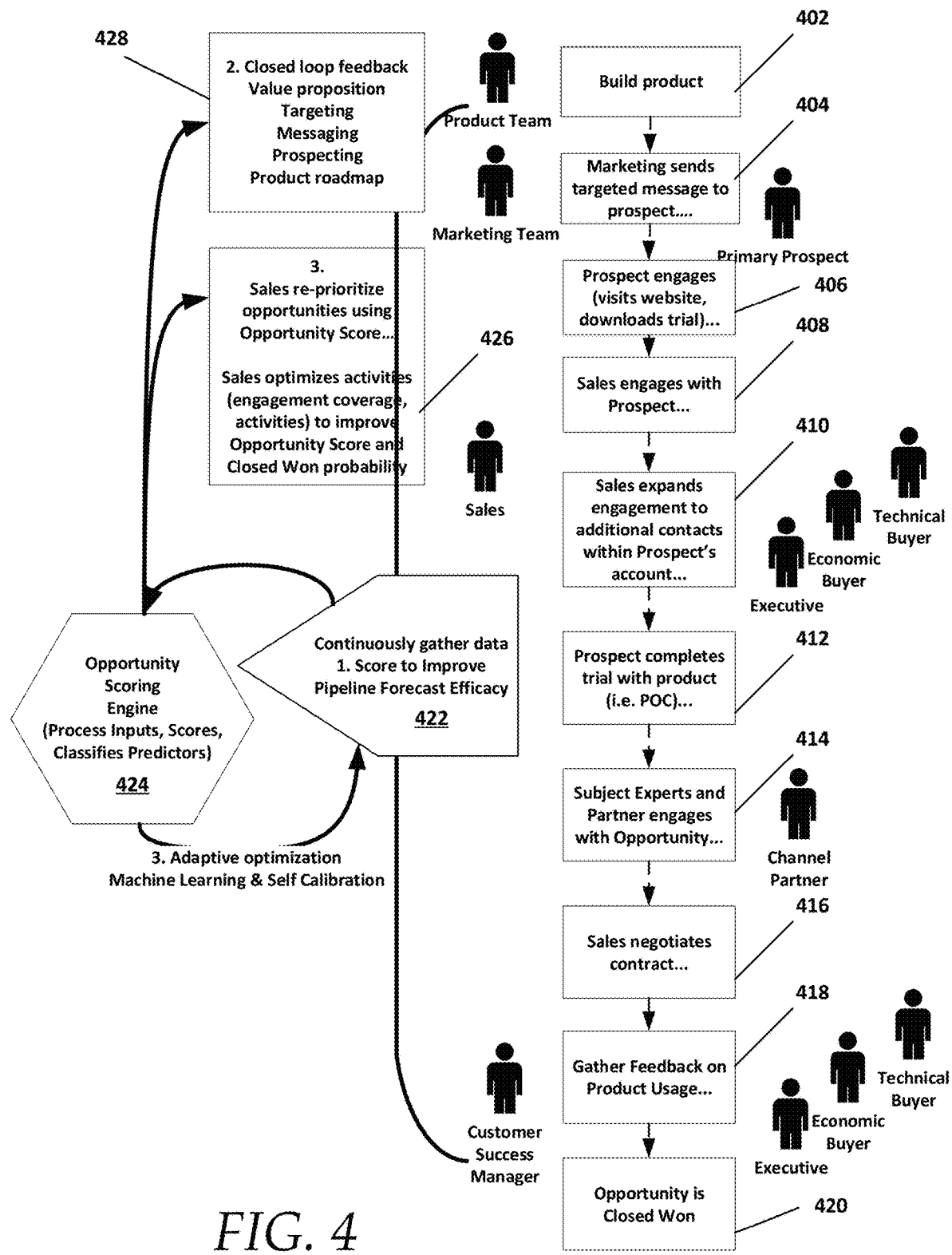
FIG. 4 illustrates an example use case that applies the machine learning and adaptive optimization techniques of FIGS. 1 and 2.

FIG. 4 illustrates an example use case of the present disclosure that utilizes the machine learning and adaptive optimization processes described herein. In one embodiment, a provider builds a software product in step 402. In step 404, a targeted proposal is directed to a prospect. When the prospect engages with the targeted proposal in step 406, the prospect will download the product. The sales team can then engage with the prospect in step 408.

Next, the sales team can engage with additional related prospects that are associated with the original prospect in step 410. The prospect completes use of the trial of the product in step 412. High level technical sales agents engage with the prospect in step 414, and negotiations commence in step 416. The prospect is surveyed for feedback in step 418, using targeted proposals. The prospect is then converted to a paying customer in step 420.

During steps 402-420 data is gathered as input to the system. This data includes the explicit and implicit data described above. This input is fed into a scoring system in step 422. Continual opportunity scoring occurs in step 424, which is part of an adaptive optimization of prospects and machine learning algorithm that tunes targeted proposals and/or sales techniques.

Step 426 includes an optimization where opportunities are continually re-prioritized using the continually updated optimization scores. That is, the system is continually receiving input of open opportunities and closed opportunities (both successful and non-successful) and using this new input to update opportunity scores for open prospects. The system can also optimize sales activities based on the scoring.

In step 428 the system can utilize a closed loop feedback process for selectively adjusting value propositions, targeted proposals, messaging, prospecting, and a product roadmap based on the continual rescoring, with the end goal of quickly converting high scoring prospects and adjusting targeting of prospects by identification of sticking points (low scoring aspects or components of an opportunity score). As mentioned throughout, a client can include a prospect, customer, and/or potential customer.

Figure 5:
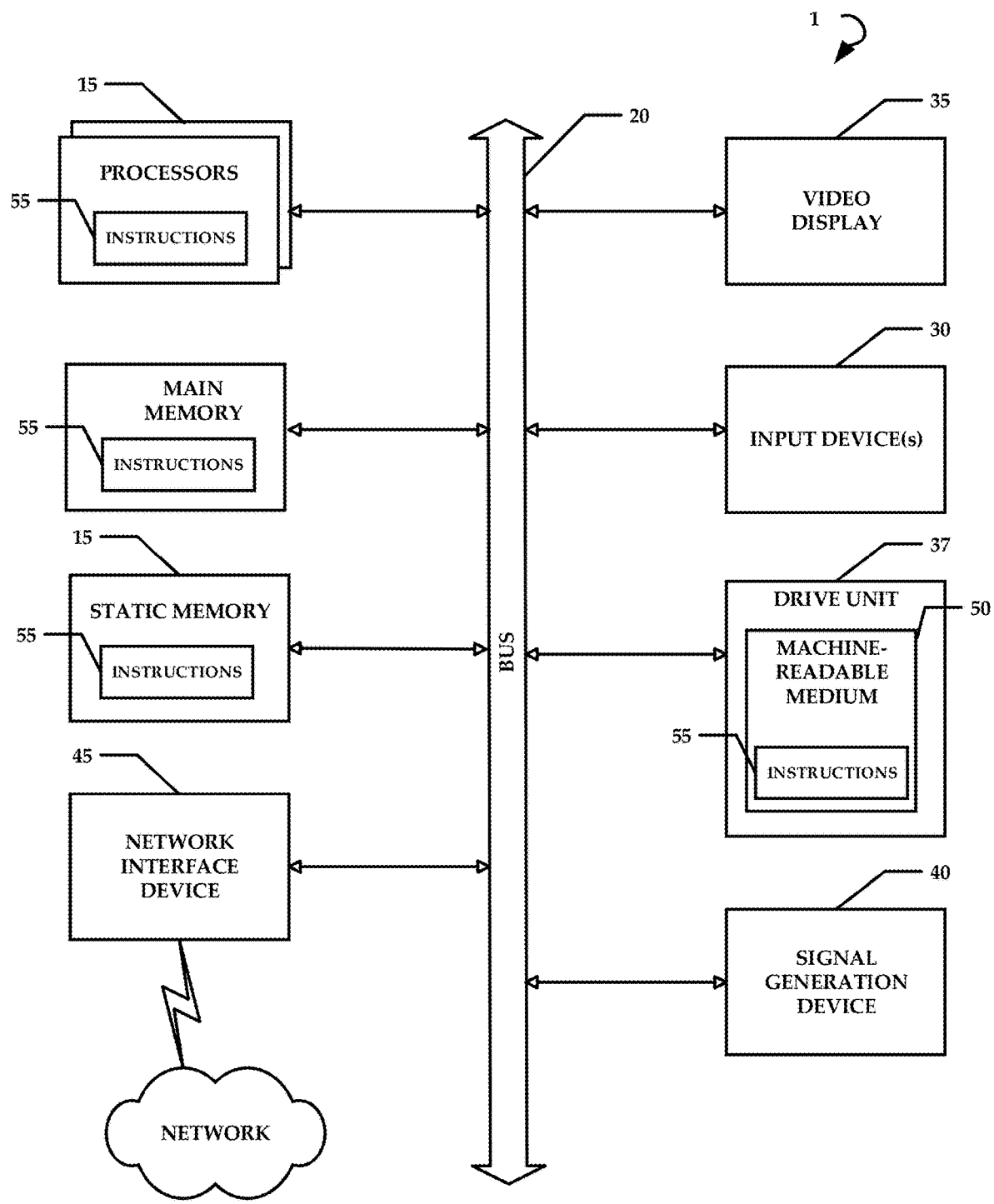
FIG. 5 is a schematic diagram of an example computer device that can be utilized to implement aspects of the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory and/or within the processor(s) 5 during execution thereof by the computer system 1. The main memory and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A machine learning and adaptive optimization method, the method comprising:
    continually receiving client data for a plurality of closed opportunities from a plurality of clients, the client data comprising client behaviors and respective outcomes of software trials of a product maintained in a database, each client of the plurality of clients having the product installed on the each client, the product updating a product roadmap of the product, the product roadmap comprising a technical specification for the product and the product roadmap being automatically adjustable to include a new feature;
    determining, based on the client data, predictors comprising one or more attributes that correlate to opportunities of the plurality of closed opportunities that resulted in a purchase of the product;
    continually segmenting open opportunities using the client data and the predictors for the product;
    continually scoring the open opportunities using the client data and the predictors for the product;
    automatically updating a technical specification of the product using the segmented open opportunities and the scored open opportunities;
    updating the predictors based on client data received for opportunities of the open opportunities that resulted in a purchase of the product; and
    applying a feedback loop that utilizes, for the continually segmenting and continually scoring the open opportunities, client behaviors of the clients receiving a targeted proposal if the client behaviors result in closed opportunities, the feedback loop placing the client behaviors into the database and updating the predictors based on client data received from the clients resulting in the closed opportunities, the feedback loop being a closed loop feedback process for selectively adjusting value propositions, targeted proposals, messaging, prospecting, and the product roadmap based on continual rescoring, with a goal of quickly converting high scoring prospects and adjusting targeting of prospects by identification of sticking points, the sticking points being low scoring aspects or components of an opportunity score.

2. The method according to claim 1, further comprising:
    calibrating a targeting scheme based on the segmenting and the scoring;
    selectively adjusting the targeted proposal for each of the open opportunities based on the targeting scheme;
    selectively sourcing individuals based on the segmenting and the scoring; and
    selectively presenting the targeted proposal for each individual to create expansion opportunities based on the targeting scheme.

3. The method according to claim 1, further comprising prioritizing clients associated with the open opportunities based on the continual scoring.

4. The method according to claim 3, wherein highest scoring open opportunities comprise client behaviors that are indicative of, or match, the client behaviors of successful closed opportunities.

5. The method according to claim 1, further comprising providing the product for download trial to clients.

6. The method according to claim 1, wherein the client data comprises explicit data and implicit data.

7. The method according to claim 6, wherein the explicit data comprise any of demographics, qualifications, survey responses, assessments, deal registrations, and third party data sources.

8. The method according to claim 6, wherein the implicit data comprise any of pre-sales and post-sales account engagement, marketing engagement, prospect usage of the product, and combinations thereof.

9. A machine learning and adaptive optimization method, the method comprising:
    continually receiving client data for a plurality of closed opportunities from a plurality of clients, the client data comprising client behaviors and respective outcomes of software trials of a product maintained in a database, each client of the plurality of clients having the product installed on the each client, the product updating a product roadmap of the product, the product roadmap comprising a technical specification for the product and the product roadmap being automatically adjustable to include a new feature;
    determining, based on the client data, predictors comprising one or more attributes that correlate to successful opportunities of the plurality of closed opportunities that resulted in a purchase of the product, the predictors further comprising one or more attributes that correlate to unsuccessful opportunities of the plurality of closed opportunities that did not result in purchases of the product;
    continually segmenting open opportunities using the predictors, the client behaviors, and respective outcomes;
    continually scoring the open opportunities using the predictors, the client behaviors, and respective outcomes;
    automatically updating a technical specification of the product using the segmented open opportunities and the scored open opportunities;
    tailoring a targeted proposal to clients associated with the open opportunities that have client behaviors that are associated with closed won opportunities; and
    applying a feedback loop that utilizes, for the continually segmenting and the continually scoring the open opportunities, client behaviors of the clients receiving the targeted proposal if the client behaviors result in closed opportunities, the feedback loop placing the client behaviors into the database and updating the predictors based on client data received from the clients resulting in the closed opportunities, the feedback loop being a closed loop feedback process for selectively adjusting value propositions, targeted proposals, messaging, prospecting, and the product roadmap based on continual rescoring, with a goal of quickly converting high scoring prospects and adjusting targeting of prospects by identification of sticking points, the sticking points being low scoring aspects or components of an opportunity score.

10. A machine learning and adaptive optimization system, the system comprising:
a processor; and
a memory communicatively coupled to the processor and storing instructions, the instructions being executable by the processor to:
continually receive client data for a plurality of closed opportunities from a plurality of clients, the client data comprising client behaviors and respective outcomes of software trials of a product maintained in a database, each client of the plurality of clients having the product installed on the each client, the product updating a product roadmap of the product, the product roadmap comprising a technical specification for the product and the product roadmap being automatically adjustable to include a new feature;
determine, based on the client data, predictors that include weighted client behaviors and respective outcomes from closed opportunities of the plurality of closed opportunities that resulted in a purchase of the product;
continually segment open opportunities using the weighted client behaviors and respective outcomes relative to the predictors for the product;
continually score the open opportunities using the weighted client behaviors and respective outcomes relative to the predictors for the product;
automatically update a technical specification of the product using the segmented open opportunities, the scored open opportunities, and the predictors;
update the predictors based on client data received for opportunities of the open opportunities that result in successfully closed opportunities; and
applying a feedback loop that utilizes, for the continually segment and the continually score the open opportunities, client behaviors of the clients receiving a targeted proposal if the client behaviors result in closed opportunities, the feedback loop placing the client behaviors into the database and updating the predictors based on client data received from the clients resulting in the closed opportunities, the feedback loop being a closed loop feedback process for selectively adjusting value propositions, targeted proposals, messaging, prospecting, and the product roadmap based on continual rescoring, with a goal of quickly converting high scoring prospects and adjusting targeting of prospects by identification of sticking points, the sticking points being low scoring aspects or components of an opportunity score.

11. The system according to claim 10, wherein the processor further executes the instructions to selectively adjust the targeted proposal for each of the open opportunities based on a targeting scheme.

12. The system according to claim 10, wherein the processor further executes the instructions to selectively source in prospects based on the segmentation and the scoring.

13. The system according to claim 10, wherein the processor further executes the instructions to selectively present the targeted proposal to existing customers and create expansion opportunities based on a targeting scheme.

14. The system according to claim 10, wherein the processor further executes the instructions to prioritize clients associated with the open opportunities based on the continual scoring.

15. The system according to claim 14, wherein highest scoring open opportunities comprise the client behaviors that are indicative of, or match, the client behaviors of successful closed opportunities.

16. The system according to claim 10, wherein the processor further executes the instructions to provide the product for download to clients.

17. The system according to claim 10, wherein the client behaviors comprises explicit data and implicit data.

18. The system according to claim 17, wherein the explicit data comprise any of demographics, qualifications, survey responses, assessments, deal registrations, and third party data sources.

19. The system according to claim 17, wherein the implicit data comprise any of pre-sales and post-sales account engagement, marketing engagement, client usage, and combinations thereof.

20. The system according to claim 10, wherein the processor further executes the instructions to selectively adjust one or more phases of a targeting scheme, the one or more phases associated with the software trials.

21. The system according to claim 20, wherein the one or more phases comprises pre-trial, trial, purchase, and post-purchase.

22. The system according to claim 20, wherein the targeting scheme comprises client engagement emails.

* * * * *